(12) United States Patent
    Kaara

(10) Patent No.: US 10,194,312 B2
(45) Date of Patent: Jan. 29, 2019

(54) SUBSCRIBER MANAGEMENT IN A MOBILE COMMUNICATION NETWORK

(71) Applicant: Telia Company AB, Solna (SE)

(72) Inventor: Pasi Kaara, Tampere (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 15/792,367

(22) Filed: Oct. 24, 2017

(65) Prior Publication Data

US 2018/0115887 A1    Apr. 26, 2018

(30) Foreign Application Priority Data

Oct. 25, 2016   (FI) .................................... 20165804

(51) Int. Cl.
| | |
|---|---|
| *H04W 8/20* | (2009.01) |
| *H04W 8/08* | (2009.01) |
| *H04W 8/02* | (2009.01) |
| *H04W 8/06* | (2009.01) |
| *H04W 60/00* | (2009.01) |
| H04W 60/06 | (2009.01) |

(52) U.S. Cl.
CPC ............. *H04W 8/20* (2013.01); *H04W 8/02* (2013.01); *H04W 8/06* (2013.01); *H04W 8/08* (2013.01); *H04W 60/00* (2013.01); *H04W 60/005* (2013.01); *H04W 60/06* (2013.01)

(58) Field of Classification Search
CPC .......... H04W 60/00; H04W 8/08; H04W 8/20
See application file for complete search history.

(56) References Cited

U.S. PATENT DOCUMENTS

| | | | | |
|---|---|---|---|---|
| 5,247,698 | A * | 9/1993 | Sawyer | H04W 60/00 455/435.1 |
| 6,381,456 | B1 * | 4/2002 | Ko | H04W 4/24 455/411 |
| 6,731,932 | B1 * | 5/2004 | Rune | H04W 8/12 455/422.1 |
| 7,643,829 | B2 * | 1/2010 | Hiyama | H04W 60/00 455/432.1 |
| 9,344,845 | B2 * | 5/2016 | Li | H04W 24/08 |

(Continued)

FOREIGN PATENT DOCUMENTS

| | | | | |
|---|---|---|---|---|
| EP | 2187681 | A1 * | 5/2010 | ............. H04W 8/04 |
| EP | 2187681 | A1 | 5/2010 | |

(Continued)

OTHER PUBLICATIONS

Finnish Search Report, dated May 9, 2017, from corresponding FI application No. 20165804.

*Primary Examiner* — Babar Sarwar
(74) *Attorney, Agent, or Firm* — Young & Thompson

(57) ABSTRACT

The invention relates to a solution for managing subscriber information in a mobile communication network. In the solution information on a subscriber is obtained and inquiries are generated to a plurality of subscriber registers at a plurality of instants of time. The inquiries are performed in order to determine if the subscriber is registered in the subscriber registers at the instants of time. If this is the case a message is generated for canceling the registration of the subscriber in subscriber registers. The solution is based on a method, a network node, a computer program code and a system.

16 Claims, 3 Drawing Sheets

(56) References Cited

U.S. PATENT DOCUMENTS

| | | | | |
|---|---|---|---|---|
| 2004/0203756 A1* | 10/2004 | Lin | .................. | H04L 12/185 |
| | | | | 455/433 |
| 2005/0261005 A1* | 11/2005 | Hu | .................. | H04W 8/06 |
| | | | | 455/456.5 |
| 2010/0035609 A1* | 2/2010 | Hui | .................. | H04W 8/06 |
| | | | | 455/433 |
| 2012/0202488 A1* | 8/2012 | Yang | .................. | H04W 8/26 |
| | | | | 455/433 |
| 2013/0244646 A1* | 9/2013 | Bojeryd | .................. | H04W 8/30 |
| | | | | 455/433 |

FOREIGN PATENT DOCUMENTS

| | | | | |
|---|---|---|---|---|
| WO | 2010/115461 A1 | 10/2010 | | |
| WO | WO-2010115461 A1 * | 10/2010 | ............ | H04W 8/12 |
| WO | 2016/122519 A1 | 8/2016 | | |
| WO | WO-2016122519 A1 * | 8/2016 | ............ | H04W 8/04 |

\* cited by examiner

| Subscriber ID | | | |
|---|---|---|---|
| | VLR1 | VLR2 | VLR3 |
| t1 | Yes/No | Yes/No | Yes/No |
| t2 | Yes/No | Yes/No | Yes/No |

# SUBSCRIBER MANAGEMENT IN A MOBILE COMMUNICATION NETWORK

TECHNICAL FIELD

The invention concerns in general the technical field of mobile communication networks. More particularly, the invention concerns management of subscribers in the mobile communication network.

BACKGROUND

Mobile communication network provides communication services to subscribers residing in an operational area of the mobile communication network in question. The mobile communication network may be divided to two sub-entities i.e. a core network (CN) and a radio access network (RAN). The radio access network provides the communication services over radio signals to subscribers, i.e. communication terminals, under control of the core network.

The core network has a plurality of tasks in the provision of communication services to the subscribers. For example, the core network performs authentication, call control/switching and charging related operations among other tasks. Subscriber management plays an important role in order to perform operations of the core network. The mobile communication network shall be aware of subscribers being served by the mobile communication network in question. For example, the following pieces of information shall be known:

- subscribers, which are registered in the communication network in question
- subscribers belonging to a certain network (i.e. to so called home network), which are served by some other mobile communication network (i.e. roaming)
- subscriber location
- subscriber status (e.g. detached, idle, connected)
. . .

In order to manage subscription related information the core network maintains one or more registers in which e.g. the mentioned pieces of subscriber information may be stored. Such registers are, for example, HLR (Home Location Register) and VLR (Visitor Location Register). The HLR contains information about the subscribers' identity, his telephone number, associated services and general information about the location of the subscriber. The VLR, in turn, contains the exact location of all mobile subscribers currently present in the service area of a mobility management entity, such as MSC or MME, of the mobile communication network in question. This information is necessary to route a call correctly in the radio access network. The above mentioned network element names are examples and may vary according to a network technology.

The subscriber registers get typically updated in a context of location update procedure in which information on the location of the subscriber is stored in the register in question. Some examples of the occasions when the location update is performed are an attachment of the subscription to a mobile communication network and periodic or random location update procedures e.g. when the subscription moves from one location area to another and initiates the update procedure towards the network.

As described above the registrations of subscribers in the registers are normal operations of the mobile communication network. However, it may happen that the subscriber is registered in a plurality of registers of one or more mobile communication networks at the same time even if there exist procedures which aim to prevent such a double registration. An example of such a situation is that a terminal device representing the subscriber in the network terminates, for any reason, the location update procedure towards a certain mobility management entity, but the same terminal device still continues an operation towards a register, such as to a HLR. This is misoperation due to the fact that the termination of the location update procedure shall cause canceling of connection both to the mobility management entity and to the register. Now, as the subscription is maintained registered in the first register it may happen that the subscription gets also registered in another register in the same or in another network when the terminal device initiates a location update, or e.g. an attachment, to another mobility management entity and register. As a result a double registration is generated. The above described situation may e.g. happen in a traffic burst situation which may cause the mobility management entity to dismiss signaling messages in the network in order to release resources for handling the traffic burst situation and, as a result, the double registration occurs. Generally speaking the dismiss of signaling messages may occur when there exist breaks in signaling network, for instance. Naturally the registration may occur in more than two registers for the same reasons.

In view of the foregoing there is a need to establish solutions for solving, at least in part, the above described situations.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a network node, a computer program product and a system for managing subscriber information in a mobile communication network. Another objective of the invention is that the method, the network node, the computer program product and the system enables managing at least in part a situation in which a subscriber is registered in a plurality of subscriber registers.

The objectives of the invention are reached by a method, a network node, a computer program product and a system as defined by the respective independent claims.

According to a first aspect, a method for managing subscriber information in a mobile communication network is provided, the method comprises: obtaining information on a subscriber; generating a first inquiry at a first instant of time to at least two subscriber registers for inquiring if the subscriber is registered in at least two subscriber registers; receiving a first response to the first inquiry; generating a second inquiry at a second instant of time differing from the first instant of time to the at least two subscriber registers for inquiring if the at least one subscriber is registered in at least two subscriber registers from the at least two subscriber registers; receiving a second response to the second inquiry; determining on a basis of the first response and the second response if the at least one subscriber is registered in at least two subscriber registers at the first instant of time and at the second instant of time; in response to a determination that the at least one subscriber is registered in at least two subscriber registers at the first instant of time and at the second instant of time generating a message canceling the registration of the at least one subscriber at least to each of the at least two subscriber registers.

The obtain of information on the subscriber may be performed in response to a receipt of location update messages from at least two subscriber registers. Further, the obtain of information on the subscriber may be performed in response to the receipt of the location update messages from the at least two subscriber registers within a time limit.

Signals towards a plurality of subscriber registers may be generated simultaneously in the inquiry.

Information relating to instants of time when subscriber information shall be obtained from the at least two subscriber registers may be added in at least one of the following: the first inquiry, the second inquiry.

Moreover, the determination if the at least one subscriber is registered in at least two subscriber registers may be performed, for each instants of time, by determining if the responses from the at least two subscriber registers carries an indication on the same subscriber either directly or indirectly.

The message canceling the registration of the at least one subscriber may be a cancel location message.

According to a second aspect, a network node for managing subscriber information in a mobile communication network is provided, the network node comprising: at least one processor; at least one memory including computer program code; the at least one memory and the computer program code configured to, with the at least one processor, cause the network node to perform: obtain information on a subscriber; generate a first inquiry at a first instant of time to at least two subscriber registers for inquiring if the subscriber is registered in at least two subscriber registers; receive a first response to the first inquiry; generate a second inquiry at a second instant of time differing from the first instant of time to the at least two subscriber registers for inquiring if the at least one subscriber is registered in at least two subscriber registers from the at least two subscriber registers; receive a second response to the second inquiry; determine on a basis of the first response and the second response if the at least one subscriber is registered in at least two subscriber registers at the first instant of time and at the second instant of time; in response to a determination that the at least one subscriber is registered in at least two subscriber registers at the first instant of time and at the second instant of time generating a message cancel the registration of the at least one subscriber at least to each of the at least two subscriber registers.

The network node may be configured to obtain of information on the subscriber in response to a receipt of location update messages from at least two subscriber registers. Further, the network node may be configured to obtain of information on the subscriber in response to the receipt of the location update messages from the at least two subscriber registers within a time limit.

The network node may be configured to generate signals towards a plurality of subscriber registers simultaneously in the inquiry.

The network node may be configured to add information relating to instants of time when subscriber information shall be obtained from the at least two subscriber registers in at least one of the following: the first inquiry, the second inquiry.

The network node may be configured to perform the determination if the at least one subscriber is registered in at least two subscriber registers, for each instants of time, by determining if the responses from the at least two subscriber registers carries an indication on the same subscriber either directly or indirectly.

The network node may be configured to generate a cancel location message at least to each of the at least two subscriber registers as the message canceling the registration of the at least one subscriber.

According to a third aspect, a computer program product is provided wherein the computer program product comprising at least one computer-readable storage medium having computer-executable program code instructions stored therein for performing the method according to the first aspect when the computer program product is executed on a computer.

According to a fourth aspect, a system for managing subscriber information is provided, the system comprising: a network node, a plurality of subscriber registers; wherein the system: the network node is configured to: obtain information on a subscriber; generate a first inquiry at a first instant of time to at least two subscriber registers for inquiring if the subscriber is registered in at least two subscriber registers; receive a first response to the first inquiry; generate a second inquiry at a second instant of time differing from the first instant of time to the at least two subscriber registers for inquiring if the at least one subscriber is registered in at least two subscriber registers from the at least two subscriber registers; receive a second response to the second inquiry; determine on a basis of the first response and the second response if the at least one subscriber is registered in at least two subscriber registers at the first instant of time and at the second instant of time; in response to a determination that the at least one subscriber is registered in at least two subscriber registers at the first instant of time and at the second instant of time generating a message cancel the registration of the at least one subscriber at least to each of the at least two subscriber registers; and wherein the system: at least two subscriber registers of the plurality of the subscriber registers are configured to: generate a first response and a second response to the first inquiry and the second inquiry correspondingly, and cancel the registration of the at least one subscriber at least to each of the at least two subscriber registers in response to a message received from the network node.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

The expression "a number of" refers herein to any positive integer starting from one, e.g. to one, two, or three unless otherwise mentioned.

The expression "a plurality of" refers herein to any positive integer starting from two, e.g. to two, three, or four unless otherwise mentioned.

The terms "first" and "second" do not denote any order, quantity, or importance, but rather are used to distinguish one element from another unless otherwise mentioned.

BRIEF DESCRIPTION OF FIGURES

The embodiments of the invention are illustrated by way of example, and not by way of limitation, in the figures of the accompanying drawings.

FIG. 1 illustrates schematically an example of a system into which the invention may be implemented to.

FIG. 3 illustrates schematically an example of a data record exploitable in a context of an embodiment of the invention.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figures 1, 3:
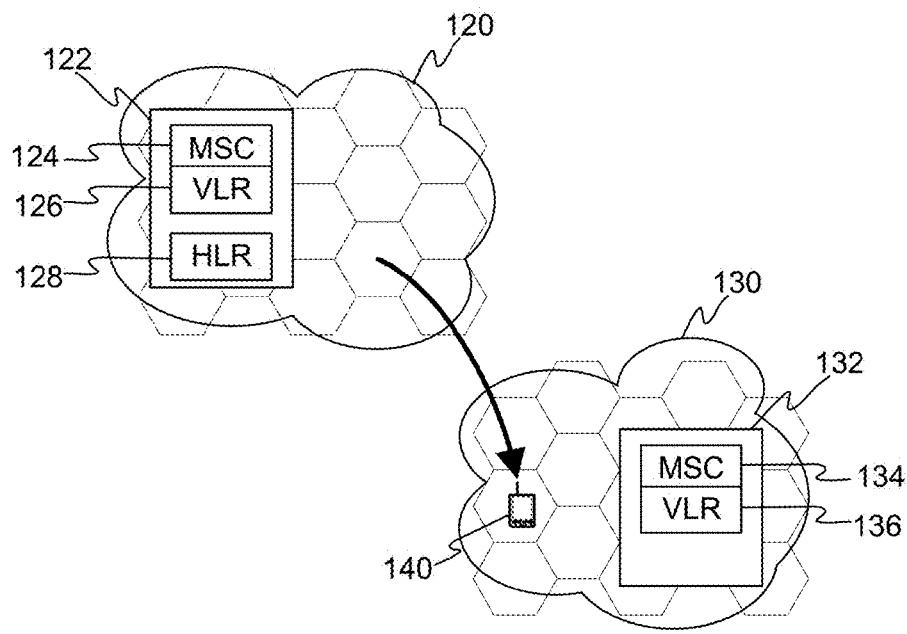

FIG. 1 schematically illustrates two cell based mobile communication networks 120, 130 whose services one or more subscribers 140 may utilize. In order to utilize the services of the mobile communication networks 120, 130 the subscriber 140 is authorized to access the mentioned networks. Typically, the access to a mobile communication network is enabled by means of a subscription granted e.g. by a telecommunication network operator, which stores information to be used in the access to the network as well as in the utilization of the services of the communication networks. Commonly known implementation of the subscription is a so called Subscriber Identity Module (SIM) card, which is inserted in the terminal device in order to utilize services provided by mobile communication network(s). In other words, the SIM card is used to store necessary pieces of information needed for accessing and utilizing the services in the mobile communication network, which pieces of information are retrieved from the SIM card by the terminal device when signaling with the network. The SIM may be implemented with the physical smart card or with a software implementation also known as so called electronic SIM (eSIM). In the following the term subscriber is used for representing a user in the mobile communication networks, wherein the subscriber is physically implemented with any of the described subscriber identity module solution inserted or integrated in a terminal device in a manner as commonly known.

The mobile communication networks 120, 130 in FIG. 1 comprise corresponding core networks 122, 132 and radio access networks (not referred in FIG. 1). The core networks 122, 132 comprise network control node, or elements, referred with mobility management entities (MSC) 124, 134 and subscriber registers referred with visitor location registers (VLR) 126, 136 in FIG. 1. Additionally, a home location register (HLR) 128 is illustrated in FIG. 1 for referring that the mobile communication network 120 is a home network for the subscriber 140. The HLR may be at least communicatively coupled to the mobility management entity either directly or indirectly through another network node. The arrow in FIG. 1 refers to a typical situation in mobile communication in which the subscriber 140 moves from a service area of a first network 120 to a service area of a second network 130. In other words, the subscriber 140 is roaming in the second mobile communication network 130 in this example for explaining at least some aspects of the present invention. In the exemplified situation of FIG. 1 the mobile communication networks 120, 130 are separate to each other, e.g. managed by different telecommunication network operators, but the same situation may happen in a mobile communication network in which a plurality of network control nodes, such as MMEs, is configured to manage and control at least a part of the mobile communication network (cf. a part of radio access network), wherein the subscriber related information is maintained in a plurality of visitor location registers dedicated to one or more network control nodes.

As indicated in FIG. 1 with the arrow the subscriber 140 may move from a service area of a first network 120 to a service area of a second network 130. The subscriber 140, i.e. the subscription with the help of the terminal device, initiates a location update procedure under predetermined scheme in the network. For example, when the subscriber 140 enters a service area of a network, such as the mobile communication network 130, it initiates the location update procedure according to an implementation of the network in question. In practice it means that at least a location of the subscriber 140 is updated to a visitor location register 136. The location update information is, at least at some level, updated to home location register 128 residing in the home network 120. This shall cause the HLR 128 to initiate so called cancel location update towards a first VLR 126, or at least one previous VLR, but this does not necessarily happen and the subscriber 140 ends up to be registered in a plurality of VLRs.

Figure 2:
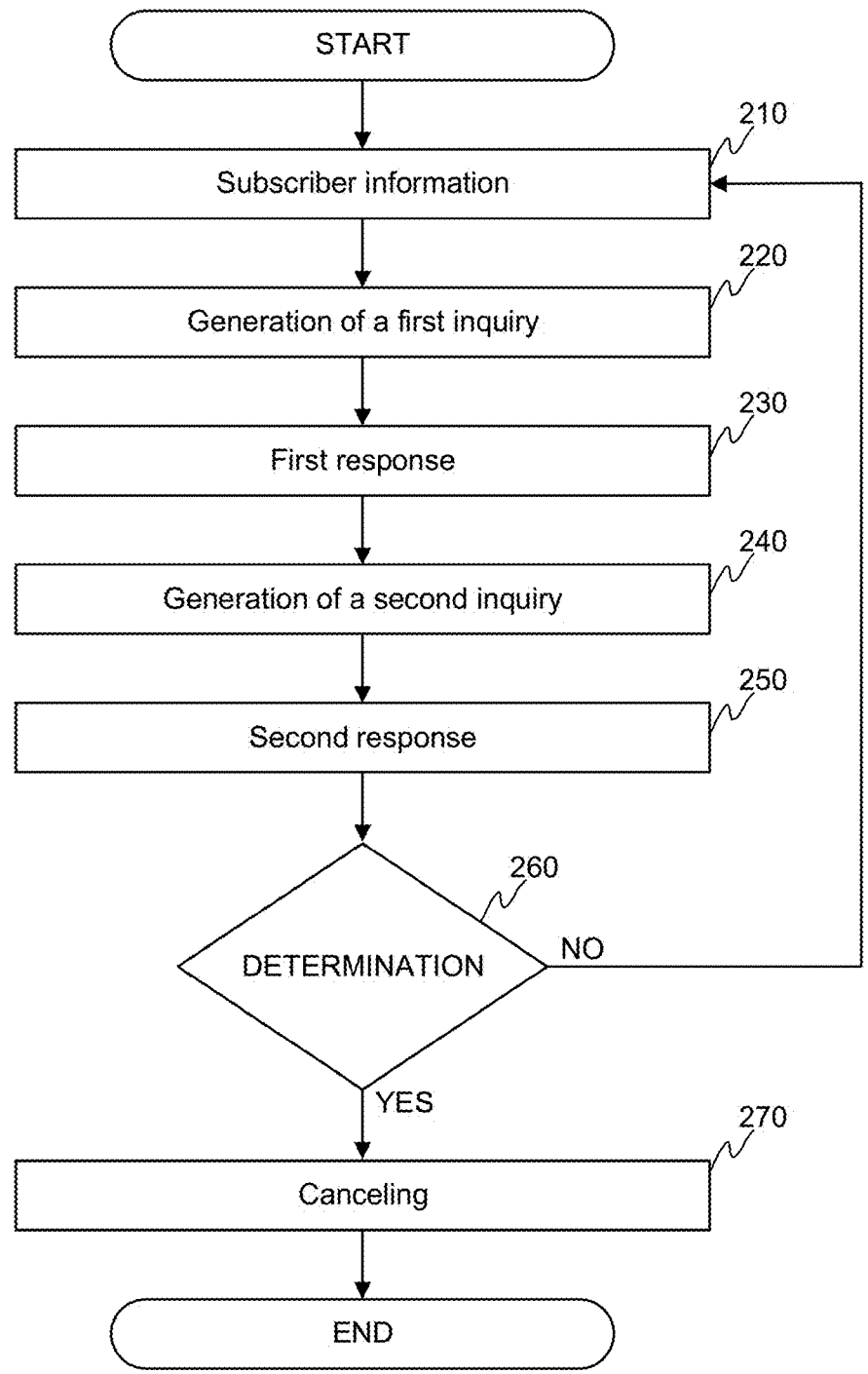
FIG. 2 illustrates schematically a method according to an embodiment of the invention.

FIG. 2 schematically illustrates an example of a method according to an embodiment of the present invention. The example of the method enables management of subscribers so that a utilization of resources in one or more mobile communication networks may be improved.

Step 210:

According to the example of the method a network node obtains, in one way or another, information on a subscriber, which may be registered in a plurality of registers in one or more mobile communication networks. The network node e.g. may be in a role that it is configured to follow, in a predetermined manner, operations in one or more mobile communication network or events relating to one or more subscribers. For example, the network node 124, 134 may e.g. be any mobility management entity, such as MSC or MME, which receives messages relating to the subscriber from a plurality of sources in the mobile communication network. A specific example is that the network node is MSC of a home network to the subscriber in question which MSC may receive location update messages from a plurality of VLRs, which may e.g. be, but is not limited to, from those mobile communication networks with which the home network operator has a roaming agreement in place. The network node may thus obtain the subscriber information from the received messages. Moreover, in some embodiment of the present invention the network node may store a time limit within which the plurality of location update messages shall be received in order to continue the method as is described herein.

As mentioned the obtain of information on the subscriber is not limited only to above given example. Generally speaking the subscriber information for the purpose of the present invention may be obtained from a plurality of sources, i.e. from such network entities which are configured to monitor and detect events, which may raise up subscriber information representing subscribers which may be registered in the plurality of registers at the same time. Alternatively or in addition, the obtain of information on the subscribers may comprise an operation, such as inquiry, towards one or more network elements by the network node. In this manner the network node may obtain subscriber information on those at least one subscriber, which may be registered in a plurality of subscriber registers.

Step 220:

In step 220, in response to an obtain of information that a subscriber may be registered in a plurality of subscriber registers, such as VLRs, at the same time the network node may be configured to generate a first inquiry at a first instant of time to at least two subscriber registers for inquiring if the subscriber is registered in at least two subscriber registers. The at least two subscriber registers may advantageously be determined by the network node in step 210, or the inquiry may be generated to all subscriber registers into which the network node is granted an access. The access may e.g. be determined on a basis of roaming agreements of the home network operator i.e. those mobile communication networks whose services may be used by a subscriber of the home network. Moreover, in some implementation of the present invention the subscriber registers may be defined so that they are relevant at the instant of time under some preconditions. For example, the network node may be configured to determine those networks into which the subscriber may have entered in a period of time between the last normal situation and the instant of time when it is determined that the subscriber may be registered in two networks. Such a determination may be performed e.g. on a basis of travel time information and a probability calculation. As a result, the first inquiry is generated to only such networks, which are the result of the determination.

According to an embodiment, the first inquiry may advantageously carry information on the subscriber which is determined, at least in a preliminary manner, to be registered in a plurality of subscriber registers in step 210. The inquiry may e.g. cause the subscriber register receiving the inquiry to respond if the subscriber is registered in the subscriber register in question or not. According to another embodiment, the inquiry may cause the subscriber register to respond by transmitting information on a plurality of subscribers to the network node. For example, the subscriber register may be configured to collect subscriber information, such as subscriber identities, on those subscriptions whose home network is the one from which the first inquiry is received. The implementation of the first inquiry is not limited to these examples only, but may vary within the limits of that from the information in the response it is possible to determine if the subscriber in question is registered in the subscriber register or not.

The term generation in step 220 and in other corresponding steps shall be understood to comprise both the composing and transmitting the message to a destination party unless otherwise mentioned.

Step 230:

A first response to the first inquiry is received in the network node. As referred above the first response may carry applicable information on the basis of which it is possible to derive, either directly or indirectly, if a subscriber is registered in the subscriber register or not.

Step 240:

In step 240, the network node may be configured to generate a second inquiry at a second instant of time to at least two subscriber registers for inquiring if the subscriber is registered in at least two subscriber registers at the second instant of time. The second instant of time differs from the first instant of time when the first inquiry is generated. The at least two subscriber registers into which the second inquiry is generated may advantageously be the same as determined by the network node in step 210, or the inquiry may be generated to all subscriber registers into which the network node is granted an access. The access in the context of the second inquiry may e.g. be determined on the same basis as described in the description of step 220.

The second inquiry may also carry information on the subscriber which is determined, at least in a preliminary manner, to be registered in a plurality of subscriber registers. The inquiry may e.g. cause the subscriber register receiving the second inquiry to respond if the subscriber is registered in the subscriber register in question or not. According to another embodiment, the second inquiry may cause the subscriber register to respond by transmitting information on a plurality of subscribers to the network node. For example, the subscriber register may be configured to collect subscriber information, such as subscriber identities, on those subscriptions whose home network is the one from which the first inquiry is received. The implementation of the first inquiry is not limited to these examples only, but may vary within the limits of that from the information in the response it is possible to determine if the subscriber in question is registered in the subscriber register or not.

The term generation in step 240 and in other corresponding steps shall be understood to comprise both the composing and transmitting the message to a destination party unless otherwise mentioned.

Step 250:

A second response to the second inquiry is received in the network node. The second response may carry applicable information on the basis of which it is possible to derive, either directly or indirectly, if a subscriber is registered in the subscriber register or not.

Step 260:

Next, as the network node has received information from at least two subscriber registers it is possible to determine if the subscriber is simultaneously registered in a plurality of subscriber registers. In case the subscriber registers indicate directly if the subscriber is registered in the subscriber register in question or not the network node may be configured to obtain the information from the response and compare the direct indication from the at least two subscriber registers to each other in order to determine if an indication of a subscriber registration exists in the at least two responses representing the subscriber status in the at least two registers at the same instant of time. Alternatively or in addition, if the information received from the at least two subscriber registers indicate indirectly if a subscriber is registered in the corresponding subscriber register or not, the network node may be configured to perform a predetermined operation for deriving the indication from the information received from the at least two subscriber registers. The predetermined operation may e.g. be a comparison of subscriber information obtained in step 210 to data included in the subscriber information received in the first and second responses from the plurality of subscriber registers.

In step 260 the network node may be configured to generate a table, as schematically illustrated in FIG. 3, for determining if a subscriber is registered in a plurality of subscriber registers. The method in the example of FIG. 3 is performed with three subscriber registers VLR1, VLR2 and VLR3. The network node receives, or derives, an indication if the subscriber (Subscriber ID) is registered in the corresponding subscriber registers VLR1, VLR2 and VLR3 at instants of time (referred with t1 and t2 in the FIG. 3) differing from each other. The indication may be input to the table as parameters Yes or No on a subscriber register basis. As a result, the network node may be configured to determine if the subscriber is registered in at least two subscriber registers among the subscriber registers VLR1, VLR2 and VLR3 at the consecutive instants of time t1, t2. If the determination 260 indicates that the subscriber in question is not registered in a plurality of subscriber registers, the network node may return to a state 210 in which, at some point of time, it is obtained information on a subscriber which may be registered in a plurality of subscriber registers and the method as describer is performed again. An operation in response to a positive outcome of the determination 260 is discussed below in step 270.

Step 270:

In case the determination step 260 generates a positive result i.e. the subscriber is registered in at least two subscriber registers among the plurality of subscriber registers at the differing instants of time the network node is configured to generate a message causing a cancellation of the registration of the subscriber in the at least two subscriber registers (VLR1, VLR2 and VLR3 in FIG. 3). In other words, the network node generates a message at least all those subscriber registers into which the subscriber is registered to. In some embodiment of the invention the network node may be configured to generate the cancellation message to all subscriber registers into which it has access in the way as discussed above.

The term generation in step 270 shall be understood to comprise both the composing and transmitting the message to a destination party unless otherwise mentioned.

The example of the method as discussed above is described, for sake of clarity, from a viewpoint that the subscriber information refers to only one subscriber identity. However, this does not limit the invention to such an implementation only, but information on a plurality of subscribers may be carried in the messages, such as in inquiries, for performing the method as described to the plurality of the subscribers at least in part in a concurrent manner. Such an implementation improves a utilization of resources in the mobile communication networks.

The present invention may also be implemented so that only one inquiry is generated to each subscriber register, which inquiry carries information indicating to the subscriber register that the subscriber register is requested to transmit a response at least at two different instants of time. The instants of time may be explicitly defined in the inquiry. Naturally, the inquiries may carry information on the subscriber whose status is checked from the subscriber registers. The responses are transmitted from the subscriber registers in question wherein the responses carry applicable information on the basis of which it is possible to derive, either directly or indirectly, if a subscriber is registered in the subscriber register in question or not at the mentioned instants of time.

In the description of the method according to an embodiment of the invention it is introduced that the subscriber registers, such as VLRs, receive the inquiries and transmit the responses. This shall be interpreted, and to cover, any implementation in which the functionalities needed for the receipt and transmit are implemented to another entity than the subscriber register, but which obtain the necessary information from the subscriber register in question. Such an entity may e.g. be any mobility management entity, such as MSC or MME, which controls and manages at least in part an operation of the subscriber register.

According to some embodiment of the invention the inquiries, i.e. the messages delivered to at least two subscriber registers, in each of the first and the second inquiries are transmitted to all subscriber registers essentially simultaneously in order to get the status information relating to the subscriber in question at the same instant of time. According to another embodiment of the present invention the inquiries may carry information relating to instants of time when subscriber information shall be obtained from the registers being involved. For example, it may comprise an exact time when the subscriber information shall be obtained from the register and included in the response. In this manner it is possible to obtain information from the different subscriber registers, which may be compared to and be used for the purposes of the present invention in an advantageous manner. Here it is assumed that the network elements, i.e. the ones which are configured to obtain the information from the register, such as MSC or MME, are operating synchronously in different networks according to the same clock signal or their operation is synchronized so that the information may be obtained at the same instants of time from different subscriber registers. In some embodiment of the invention, the subscriber registers, or the network elements controlling and managing those, may add a time stamp in addition to the indication of the subscriber status in the response message, which may be used by the network node in the determination step 260 in order to use comparable data. Alternatively or in addition, the network node may provide inquiry identifiers in steps 220 and 240 to the subscriber registers, which, in turn, may include the same identifiers in the response message together with the other information. In this manner the network node may also follow the information provided by the registers, or the network elements controlling and managing the subscriber registers.

For sake of clarity it is worthwhile to mention that even if the steps 220, 230, 240 and 250 are shown in the FIG. 2 to be consecutive to each other the present invention is not limited to such an implementation only. The mentioned steps may be performed at least in part concurrently as long as the information obtained from the at least two subscriber registers is obtained at two instants of time differing from each other.

It is also worthwhile to mention that the subscriber register 126, or subscriber registers, of the home network 120 do not necessarily maintain information that the subscriber 140 in question is registered to it, or them. In other words, the network node does not necessarily receive the indication, such as a location update message, on the registration in a plurality of subscriber registers from the subscriber register 126 of the home network, but from other subscriber registers residing in one or more other mobile communication networks.

Figure 4:
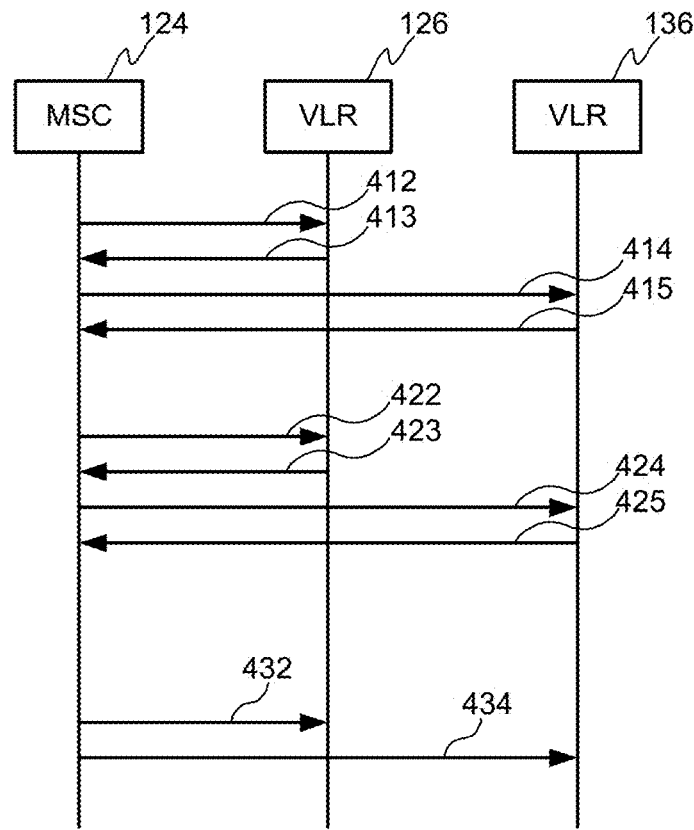
FIG. 4 illustrates schematically an embodiment of the invention in the form of a signal diagram.

FIG. 4 schematically illustrates a signal diagram according to an embodiment of the invention in which a mobility management entity, that is MSC 124 of FIG. 1 in this example, is communicatively coupled to at least two subscriber registers 126, 136 in this example. Now, the MSC 124 has obtained information that a subscriber may be registered in two subscriber registers 126, 136 it is configured to generate a first inquiry 412, 414 towards the at least two subscriber registers 126, 136 for inquiring if the subscriber is registered in a plurality of subscriber registers 126, 136. The MSC receives first response 413, 415, i.e. messages from each of the inquired registers 126, 136. In other words, the first response refers the responses received from the inquired registers. The signals 412 and 414 are transmitted at a first instant of time, which refers to a predetermined time frame, which may be exactly the same instant of time for the both signals, or a predetermined time window. Next, during a second instant of time a second inquiry 422, 424 is generated to the subscriber registers 126, 136 for inquiring if the subscriber in question is registered in the subscriber registers 126, 136 and a second response 423, 425 is received from the subscriber registers 126, 136. The MSC 124 is configured to determine on a basis of the first response and the second response, i.e. from pieces of information received in the responses, if the subscriber is registered in at least two subscriber registers at the first instant of time and at the second instant of time. If the determination brings out that the subscriber is registered in a plurality of subscriber registers 126, 136 the MSC in the role of the network node according to the present invention may generate a message 432, 434 to the subscriber registers 126, 136 for canceling the registration of the subscriber in the subscriber registers 126, 136. As mentioned the signaling diagram is an example of one embodiment of the invention and does not necessarily comprise all signals, which may occur in the environment of the present invention. For example, the network nodes and registers may deliver so called acknowledgement messages which are not illustrated in FIG. 4.

Figure 5:
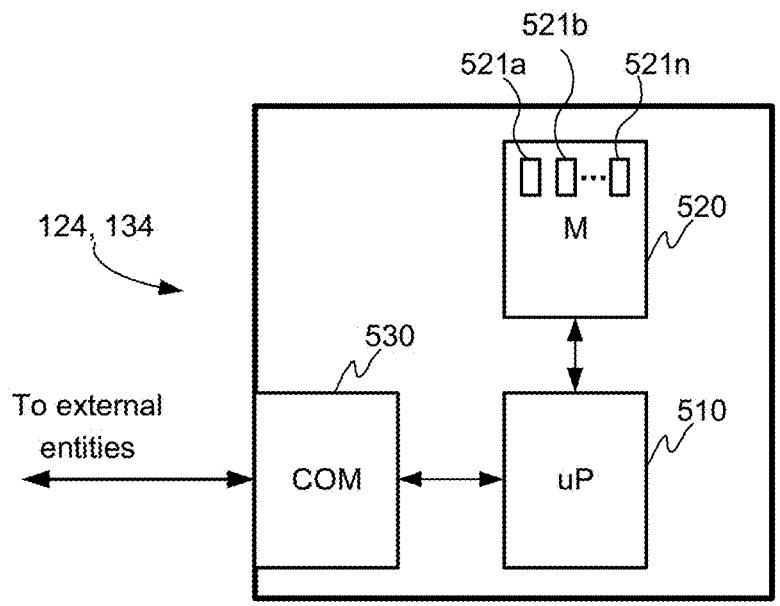
FIG. 5 illustrates schematically a network node according to an embodiment of the invention.

FIG. 5 schematically illustrates a network node 124 according to an example of the invention. The network node 124 is configured, at least partly, to implement the present invention as described. The execution of the present invention may be achieved by arranging a processor 510 to execute at least some portion of computer program code 521a-521n stored in a memory 520 causing the processor 510, and, thus, the network node to implement one or more method steps as described. The processor 510 is thus arranged to access the memory 520 and retrieve and store any information therefrom and thereto. Moreover, the processor 510 may be configured to control the communication through a communication interface 530 with any external unit, such as with at least one other network entity. In other words, the network node 124 may be communicatively coupled to at least some of the mentioned entities either directly or indirectly e.g. through another network entity or communication network. The processor 510 may also be configured to control overall operability of the network node 124 according to instructions stored in the memory 520 in a form of computer program code and parameters thereto. For sake of clarity, the processor herein refers to any unit suitable for processing information and control the operation of the network node 124 in achieving a desired operation as described. The mentioned operations may e.g. be implemented with a microcontroller solution with embedded software. Similarly, the invention is not limited to a certain type of memory only, but any memory type suitable for storing the described pieces of information may be applied in the context of the present invention. The present invention is described above so that the method is to be implemented in one network node 124. The implementation may also be done in a decentralized manner i.e. between multiple network nodes 124 that are operatively coupled to each other either directly or indirectly. Moreover, at least some of the operations or functionalities of the network node 124 may be configured to be implemented in a distributed manner.

The term network node in the description herein refers to, but is not limited to, a mobility management entity of a mobile communication network. Advantageously, it refers to a mobility management entity of a home network for a subscriber in question. The mobility management entity may e.g. be a MSC or MME depending on a network technology of the network. Alternatively or in addition, the network node may refer to any other network element which is configured to perform the described operation and may access necessary information for performing the task.

Some aspects of the present invention may also relate to a non-transitory computer-readable storage medium storing at least portions of computer program code, wherein the portions of computer program code are computer-executable program code instructions to implement the method steps in a network node 124 as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a sub-routine, element or other unit suitable for use in a computing environment. As indicated, the computer program code comprises instructions for causing the network node 124 to perform one or more of the method steps as described above.

Moreover, the invention may be implemented in a system, which is configured for managing subscriber information. As described the system comprises at least one network node 124, 134 and a plurality of subscriber registers 126, 136. In the system the network node 124, 134 may be configured to obtain 210 information on a subscriber 140; generate 220 a first inquiry 412, 414 at a first instant of time to at least two subscriber registers 126, 136 for inquiring if the subscriber 140 is registered in at least two subscriber registers 126, 136; receive 230 a first response 413, 415 to the first inquiry 412, 414; generate 240 a second inquiry 422, 424 at a second instant of time differing from the first instant of time to the at least two subscriber registers 126, 136 for inquiring if the at least one subscriber 140 is registered in at least two subscriber registers 126, 136 from the at least two subscriber registers 126, 136; receive 250 a second response 423, 425 to the second inquiry 422, 424; determine 260 on a basis of the first response 413, 415 and the second response 423, 425 if the at least one subscriber 140 is registered in at least two subscriber registers 126, 136 at the first instant of time and at the second instant of time; and in response to a determination that the at least one subscriber 140 is registered in at least two subscriber registers 126, 136 at the first instant of time and at the second instant of time generating 270 a message 432, 434 cancel the registration of the at least one subscriber 140 at least to each of the at least two subscriber registers 126, 136. Correspondingly, the at least two subscriber registers 126, 136 of the plurality of the subscriber registers 126, 136 may be configured to generate a first response 413, 415 and a second response 423, 425 to the first inquiry 412, 414 and the second inquiry 422, 424, and cancel the registration of the at least one subscriber 140 at least to each of the at least two subscriber registers 126, 136 in response to a message 432, 434 received from the network node 124, 134.

The canceling of the plurality of registrations causes the subscriber to re-register to a communication network in a known manner. In this manner, the subscriber ends up to be registered in one subscriber register, which is a correct state of registration.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for managing subscriber information in a mobile communication network, the method comprises:
obtaining information on a subscriber,
generating a first inquiry at a first instant of time to at least two subscriber registers for inquiring if the subscriber is registered in at least two subscriber registers,
receiving a first response to the first inquiry,
generating a second inquiry at a second instant of time differing from the first instant of time to the at least two subscriber registers for inquiring if the subscriber is registered in at least two subscriber registers from the at least two subscriber registers,
receiving a second response to the second inquiry,
determining on a basis of the first response and the second response if the subscriber is registered in at least two subscriber registers at the first instant of time and at the second instant of time, and
in response to a determination that the subscriber is registered in at least two subscriber registers at the first instant of time and at the second instant of time generating a message canceling the registration of the subscriber at least to all those subscriber registers into which the subscriber is registered to.

2. The method of claim 1, wherein the obtaining of information on the subscriber is performed in response to a receipt of location update messages from at least two subscriber registers.

3. The method of claim 2, wherein the obtain of information on the subscriber is performed in response to the receipt of the location update messages from the at least two subscriber registers within a time limit.

4. The method of claim 1, wherein signals towards a plurality of subscriber registers are generated simultaneously in the first and second inquiry.

5. The method of claim 1, wherein information relating to instants of time when subscriber information shall be obtained from the at least two subscriber registers is added in at least one of the following: the first inquiry, the second inquiry.

6. The method of claim 1, wherein the determination if the subscriber is registered in at least two subscriber registers is performed, for each instants of time, by determining if the responses from the at least two subscriber registers carries an indication on the same subscriber either directly or indirectly.

7. The method of claim 1, wherein the message canceling the registration of the subscriber is a cancel location message.

8. A network node for managing subscriber information in a mobile communication network, the network node comprising:
at least one processor;
at least one memory including computer program code;
the at least one memory and the computer program code configured to, with the at least one processor, cause the network node to perform:
obtain information on a subscriber,
generate a first inquiry at a first instant of time to at least two subscriber registers for inquiring if the subscriber is registered in at least two subscriber registers,
receive a first response to the first inquiry,
generate a second inquiry at a second instant of time differing from the first instant of time to the at least two subscriber registers for inquiring if the subscriber is registered in at least two subscriber registers from the at least two subscriber registers,
receive a second response to the second inquiry,
determine on a basis of the first response and the second response if the subscriber is registered in at least two subscriber registers at the first instant of time and at the second instant of time,
in response to a determination that the subscriber is registered in at least two subscriber registers at the first instant of time and at the second instant of time generating a message cancel the registration of the subscriber at least to those subscriber registers into which the subscriber is registered to.

9. The network node of claim 8, wherein the network node is configured to obtain of information on the subscriber in response to a receipt of location update messages from at least two subscriber registers.

10. The network node of claim 9, wherein the network node is configured to obtain of information on the subscriber in response to the receipt of the location update messages from the at least two subscriber registers within a time limit.

11. The network node of claim 8, wherein the network node is configured to generate signals towards a plurality of subscriber registers simultaneously in the inquiry.

12. The network node of claim 8, wherein the network node is configured to add information relating to instants of time when subscriber information shall be obtained from the at least two subscriber registers in at least one of the following: the first inquiry, the second inquiry.

13. The network node of claim 8, wherein the network node is configured to perform the determination if the subscriber is registered in at least two subscriber registers, for each instants of time, by determining if the responses from the at least two subscriber registers carries an indication on the same subscriber either directly or indirectly.

14. The network node of claim 8, wherein the network node is configured to generate a cancel location message at least to each of the at least two subscriber registers as the message canceling the registration of the subscriber.

15. A non-transitory computer-readable storage medium having computer-executable program code instructions stored therein for performing the method of claim 1 when the computer program product is executed on a computer.

16. A system for managing subscriber information, the system comprising:
a network node,
a plurality of subscriber registers,
wherein the system:
the network node is configured to:
obtain information on a subscriber,
generate a first inquiry at a first instant of time to at least two subscriber registers for inquiring if the subscriber is registered in at least two subscriber registers,
receive a first response to the first inquiry,
generate a second inquiry at a second instant of time differing from the first instant of time to the at least two subscriber registers for inquiring if the subscriber is registered in at least two subscriber registers from the at least two subscriber registers,
receive a second response to the second inquiry,
determine on a basis of the first response and the second response if the subscriber is registered in at least two subscriber registers at the first instant of time and at the second instant of time,
in response to a determination that the subscriber is registered in at least two subscriber registers at the first instant of time and at the second instant of time generating a message cancel the registration of the subscriber at least to each of the at least two subscriber registers, and at least two subscriber registers of the plurality of the subscriber registers are configured to:

generate a first response and a second response to the first inquiry and the second inquiry correspondingly, and cancel the registration of the subscriber at least to all those subscriber registers into which the subscriber is registered to in response to a message received from the network node.

* * * * *